US011213723B2

(12) United States Patent
Bouck

(10) Patent No.: US 11,213,723 B2
(45) Date of Patent: Jan. 4, 2022

(54) ATHLETIC TEAM INTEGRATED COMMUNICATION, NOTIFICATION, AND SCHEDULING SYSTEM

(71) Applicant: NIKE, Inc., Beaverton, OR (US)

(72) Inventor: John Bouck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/608,412

(22) Filed: May 30, 2017

(65) Prior Publication Data

US 2017/0259123 A1 Sep. 14, 2017

Related U.S. Application Data

(63) Continuation of application No. 14/796,425, filed on Jul. 10, 2015.
(Continued)

(51) Int. Cl.
*G06F 3/0484* (2013.01)
*G16H 20/30* (2018.01)
(Continued)

(52) U.S. Cl.
CPC ...... *A63B 24/0075* (2013.01); *A63B 24/0062* (2013.01); *A63B 71/0619* (2013.01); *G06F 1/163* (2013.01); *G06K 9/00342* (2013.01); *G06K 9/00348* (2013.01); *G06K 9/00724* (2013.01); *G06Q 10/06* (2013.01); *G06Q 10/1093* (2013.01); *G06Q 50/01* (2013.01); *G06T 7/20* (2013.01); *A63B 2024/0065* (2013.01); *A63B 2024/0068* (2013.01); *A63B 2024/0081* (2013.01); *G06K 2209/03* (2013.01); *G06K 2209/27* (2013.01); *G06Q 10/109* (2013.01); *G06T 2207/30221* (2013.01)

(58) Field of Classification Search
CPC ........ G06G 3/0219–04883; G06T 7/20; G06F 19/3481; A63B 24/0062; A63B 24/0075; A63F 13/335; G09G 5/00; H04L 51/32; H04L 67/22
See application file for complete search history.

(56) References Cited

U.S. PATENT DOCUMENTS 9,652,135 B2 5/2017 Seo et al.
2007/0226034 A1* 9/2007 Khan ................... G06Q 10/109
705/7.19
(Continued)

FOREIGN PATENT DOCUMENTS

EP 2584770 A1 4/2013
EP 2674834 A2 12/2013
(Continued)

OTHER PUBLICATIONS

Nov. 11, 2015—(WO) ISR—App PCT/US15/39976.

*Primary Examiner* — Lin Li
(74) *Attorney, Agent, or Firm* — Banner & Witcoff, Ltd.

(57) ABSTRACT

An apparatus that displays an athletic activity notification user interface having a first display level, populating the user interface with activity notifications and determining the activity notifications include a threshold number of cumulative positive responses for users planning to attend a scheduled event, and displaying icons on the user interface representing the user that submitted the positive responses.

20 Claims, 11 Drawing Sheets

Related U.S. Application Data

(60) Provisional application No. 62/023,140, filed on Jul. 10, 2014.

(51) Int. Cl.

| | |
|---|---|
| *H04L 12/58* | (2006.01) |
| *H04M 1/27475* | (2020.01) |
| *H04L 29/08* | (2006.01) |
| *H04N 21/435* | (2011.01) |
| *G06F 3/0481* | (2013.01) |
| *A63B 24/00* | (2006.01) |
| *G06Q 50/00* | (2012.01) |
| *G06F 1/16* | (2006.01) |
| *G06K 9/00* | (2006.01) |
| *G06T 7/20* | (2017.01) |
| *A63B 71/06* | (2006.01) |
| *G06Q 10/06* | (2012.01) |
| *G06Q 10/10* | (2012.01) |

(56) References Cited

U.S. PATENT DOCUMENTS

| | | | | |
|---|---|---|---|---|
| 2009/0233771 A1* | 9/2009 | Quatrochi | ............... | G16H 20/30 482/9 |
| 2009/0262088 A1* | 10/2009 | Moll-Carrillo | ..... | G06F 3/04842 345/173 |
| 2011/0047492 A1* | 2/2011 | Bostrom | ........... | H04M 1/27475 715/765 |
| 2011/0145881 A1* | 6/2011 | Hartman | ............ | H04N 21/4438 725/118 |
| 2012/0064968 A1* | 3/2012 | Youm | ................... | A63F 13/335 463/29 |
| 2012/0212505 A1* | 8/2012 | Burroughs | .......... | G06F 19/3481 345/629 |
| 2012/0311041 A1* | 12/2012 | Aonuma | ................ | H04L 67/24 709/204 |
| 2013/0002533 A1* | 1/2013 | Burroughs | ............. | G16H 20/30 345/156 |
| 2014/0025654 A1* | 1/2014 | Brown | .................... | H04L 67/22 707/705 |
| 2014/0028565 A1* | 1/2014 | Gueorguiev | ............. | G09G 5/00 345/168 |
| 2014/0039842 A1 | 2/2014 | Yuen et al. | | |
| 2014/0047045 A1* | 2/2014 | Baldwin | .................. | H04L 51/32 709/206 |
| 2014/0280622 A1* | 9/2014 | Albert | ..................... | H04L 51/32 709/206 |
| 2014/0282214 A1* | 9/2014 | Shirzadi | ............. | G06F 3/04883 715/781 |
| 2014/0304615 A1 | 10/2014 | Coe et al. | | |
| 2014/0315610 A1* | 10/2014 | Shachar | ................... | G06T 7/20 463/7 |
| 2014/0337450 A1 | 11/2014 | Choudhary et al. | | |
| 2014/0337763 A1* | 11/2014 | Feldstein | ............. | G06F 3/0481 715/753 |
| 2015/0177954 A1* | 6/2015 | Wei | ....................... | G06F 3/0482 715/738 |
| 2015/0271120 A1* | 9/2015 | Langholz | ............ | G06F 3/04817 709/206 |
| 2015/0312199 A1 | 10/2015 | Bastide et al. | | |
| 2015/0382076 A1* | 12/2015 | Davisson | ............... | H04N 21/435 725/62 |
| 2016/0034827 A1 | 2/2016 | Morris | | |

FOREIGN PATENT DOCUMENTS

| | | |
|---|---|---|
| EP | 2738730 A1 | 6/2014 |
| WO | 2010/006062 A1 | 1/2010 |

\* cited by examiner

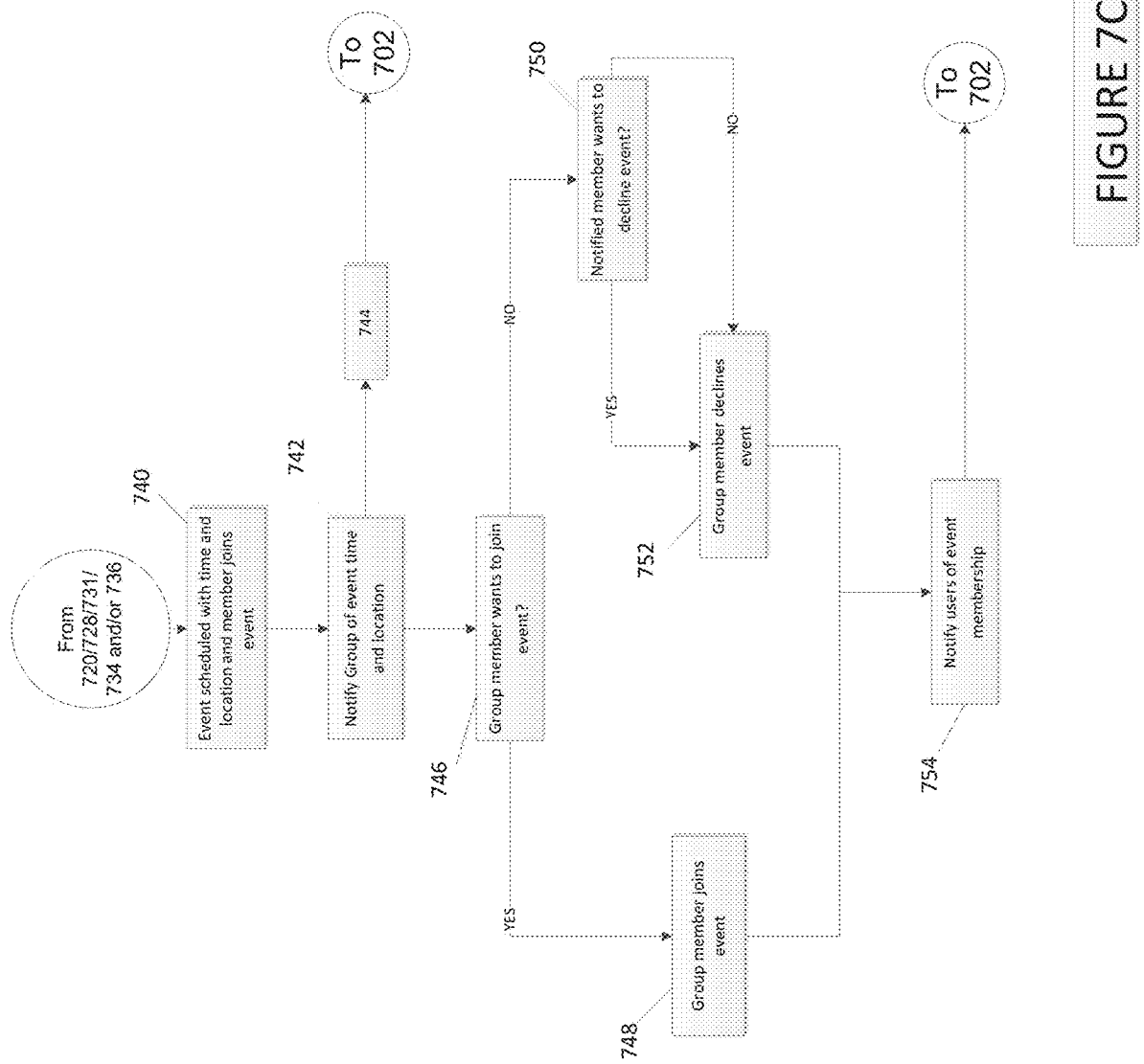

ATHLETIC TEAM INTEGRATED COMMUNICATION, NOTIFICATION, AND SCHEDULING SYSTEM

CROSS REFERENCE TO RELATED APPLICATIONS

This application is a continuation of U.S. application Ser. No. 14/796,425, filed Jul. 10, 2015, which claims the benefit of, and priority to, U.S. Provisional Patent Application No. 62/023,140, filed Jul. 10, 2014. The contents of which are expressly incorporated herein by reference in their entirety for any and all non-limiting purposes.

BACKGROUND

While most people appreciate the importance of physical fitness, many have difficulty finding the motivation required to maintain a regular exercise program. Some people find it particularly difficult to maintain an exercise regimen that involves continuously repetitive motions, such as running, walking and bicycling. Additionally, oftentimes, individuals might not be as motivated to exercise because of the extra effort that may be required in recording and tracking workout results Often, social interactions, such as with friends and/or acquaintances increase a user's desire to work out and/or engage in athletic activities. Unfortunately, very few individuals have the time, initiative, or ability to organize a group of enough members to play a particular sport, such as soccer (worldwide football) which takes 5 people for a team. In this regard, many individuals don't want to feel responsible for being the organizer of the event or events for the group. Current messaging solutions require a central organizer and/or require members to transmit individual messages to different sub-groups via different communication pathways.

SUMMARY

The following presents a general summary of aspects of the present disclosure in order to provide a basic understanding of various example features of the embodiments described herein. This summary is not intended to limit the scope of the disclosure in any way, but simply provides a general overview and context for the more detailed description that follows.

In one aspect, an apparatus is described as having a processor, and non-transitory computer-readable media having computer-executable instructions that, when executed, cause the processor to generate a user interface on a display device, the user interface having a UI display surface that has a length extending between a first end and the second end along a first axis, and a width along a second axis that is perpendicular to the first axis. The width of the UI display surface may be configured to be equal to a width of the display device. The user interface may have a first display level between the first end and a transition point, and have display positions stacked along the first axis. The user interface may additionally have a second display level positioned between the transition point and the second end, and have display positions aligned along the second axis. Further, the user interface may receive athletic activity notifications from users in chronological order, and populate the display positions with the athletic activity notifications with a most recently-received athletic activity notification positioned at the first end. Additionally, the user interface may populate the display positions within the second display level when the display positions within the first display level are all populated. The user interface may further receive a user input in a direction along the first axis towards the second end, and in response, display older athletic activity notifications by transitioning athletic activity notifications from the second display level to the first display level, and removing one or more newer athletic activity notifications from the user interface.

In another aspect, a computer-readable storage medium may have computer-readable instructions that, when executed by the processor, cause the processor to transmit an electronic invitation to users to participate in a scheduled athletic activity, and generate a user interface may be viewed and interacted with by the users. The user interface may have a UI display surface that has a length extending between a first end and the second end along a first axis, and a width along a second axis that is perpendicular to the first axis. The width of the UI display surface may be configured to be equal to a width of the display device. The user interface may have a first display level between the first end and a transition point, and have display positions stacked along the first axis. The user interface may additionally have a second display level positioned between the transition point and the second end, and have display positions aligned along the second axis. The user interface may additionally have a locked display element positioned at the second end of the first axis, with the locked display element statically positioned when navigating through the user interface along the first axis. The locks display element may display a status of the athletic activity associated with the electronic invitation. Further, the processor may receive acceptances from users in response to the electronic invitation, and populate the display positions with the acceptances with a most recently-received athletic activity notification positioned at the first end. Additionally, the processor may receive a message that is not an acceptance of an invitation, and may populate the display positions within the second display level when the display positions within the first display level are all populated. The user interface may further receive a user input in a direction along the first axis towards the second end, and in response, display older athletic activity notifications by transitioning athletic activity notifications from the second display level to the first display level, and removing one or more newer athletic activity notifications from the user interface.

BRIEF DESCRIPTION OF THE DRAWINGS

FIGS. 7A-7C depict an exemplary flowchart of an exemplary computer-implemented method of generating an event suggestion.

DETAILED DESCRIPTION

Aspects of this disclosure involve obtaining, storing, and/or processing athletic data relating to the physical movements of an athlete. The athletic data may be actively or passively sensed and/or stored in one or more non-transitory storage mediums. Still further aspects relate to using athletic data to generate an output, such as for example, calculated athletic attributes, feedback signals to provide guidance, and/or other information. These and other aspects will be discussed in the context of the following illustrative examples of a personal training system.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
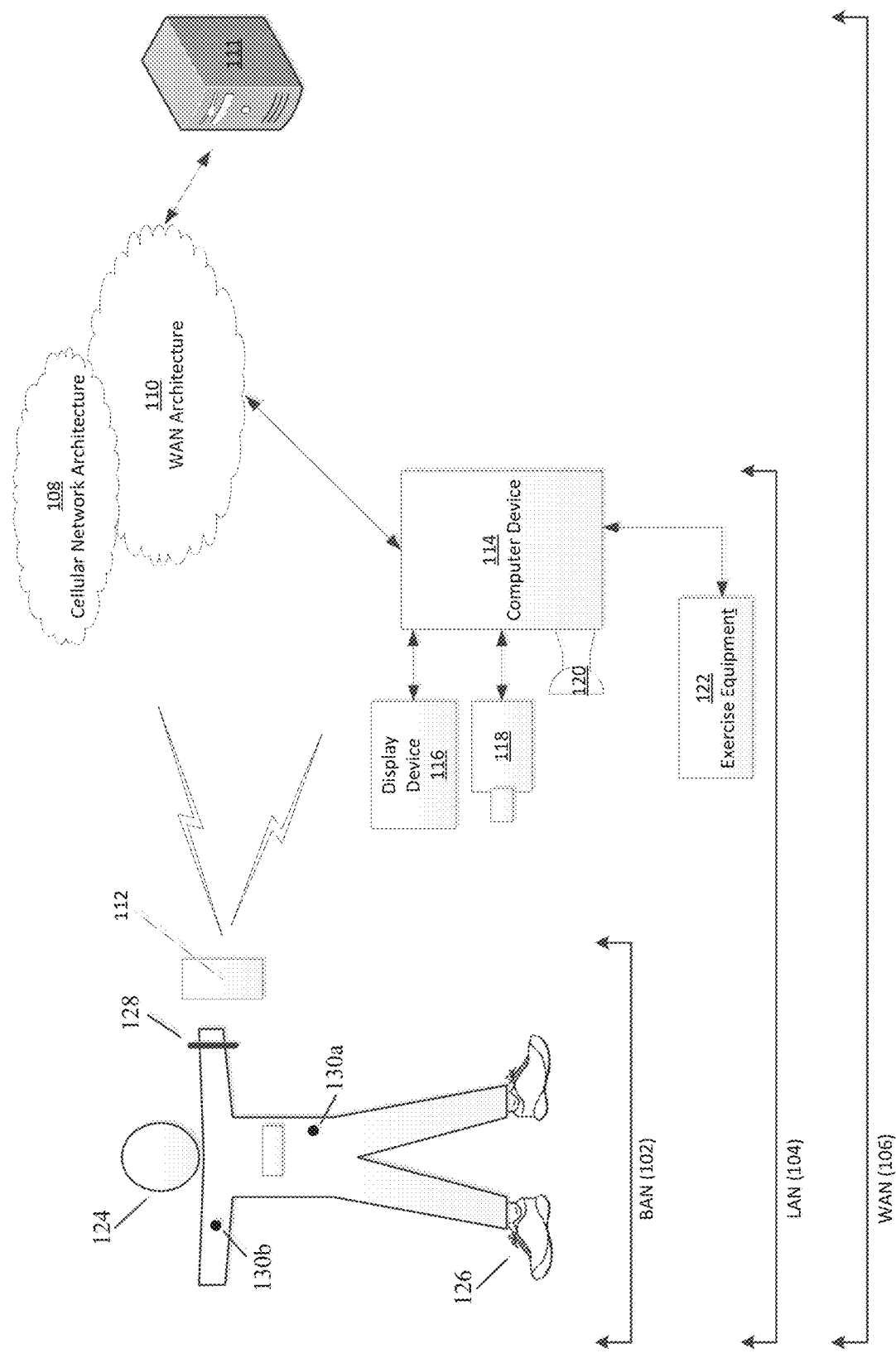
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
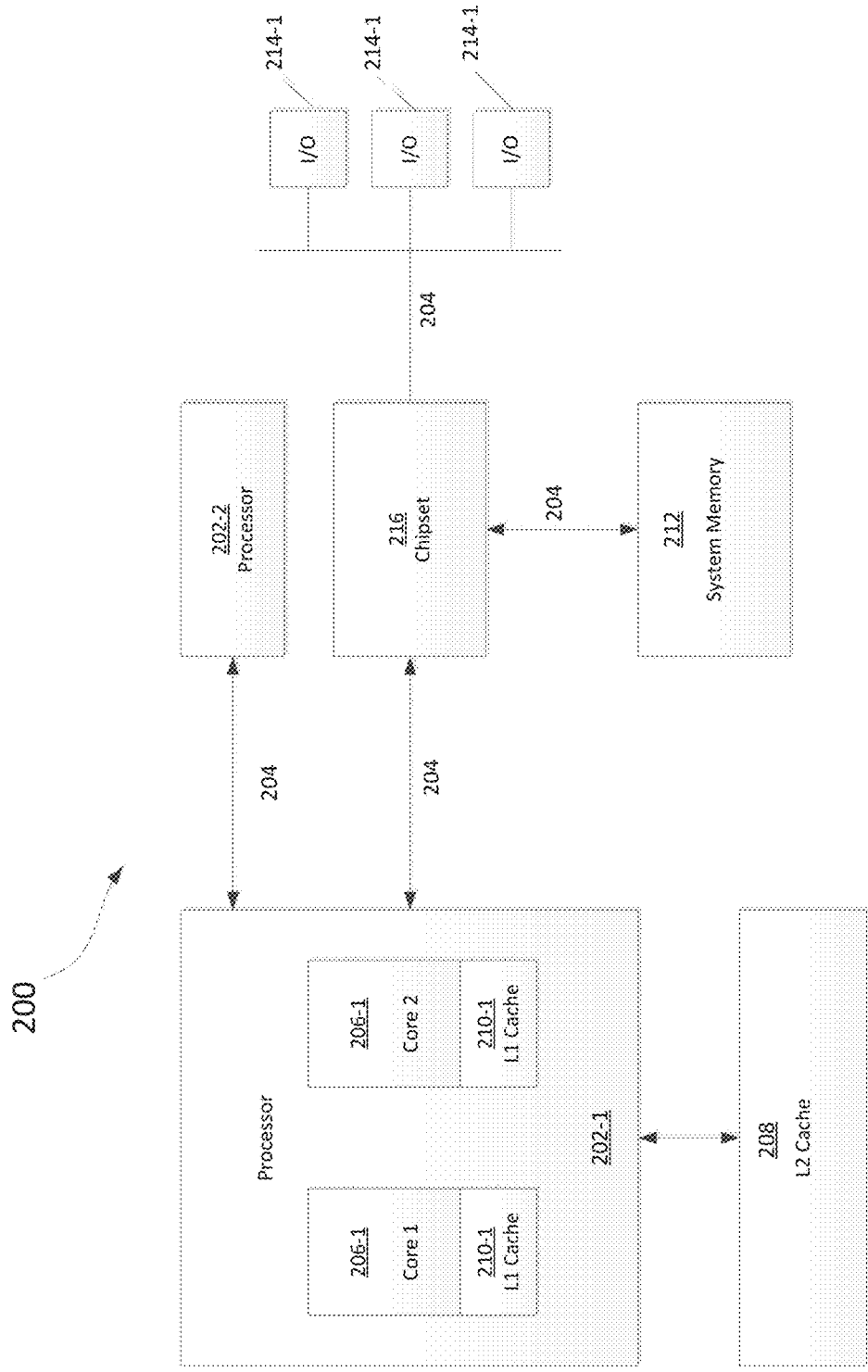
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 118 and/or sensor 128 may comprise one or more thermal imaging devices. In one embodiment, image-capturing device 118 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
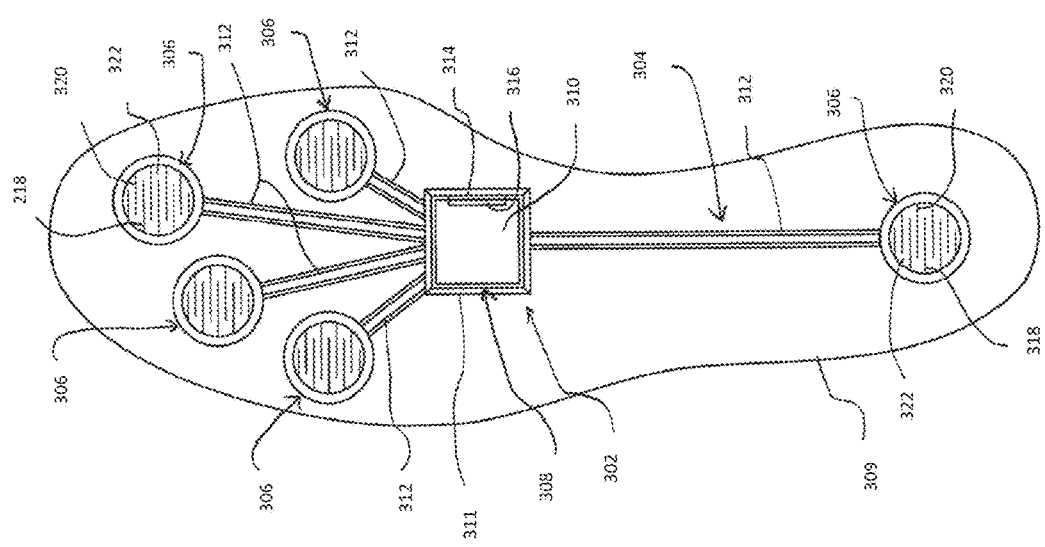
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
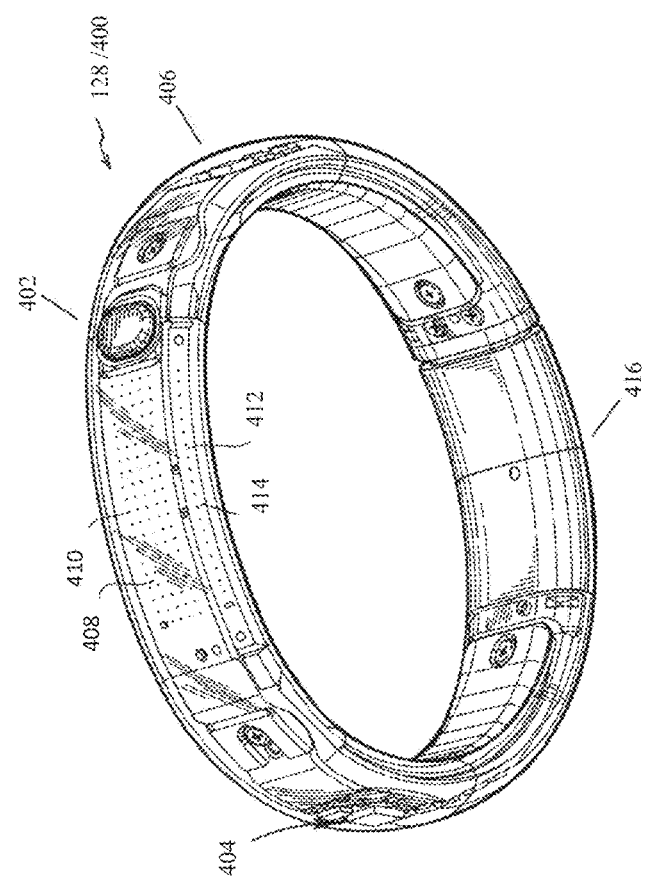
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
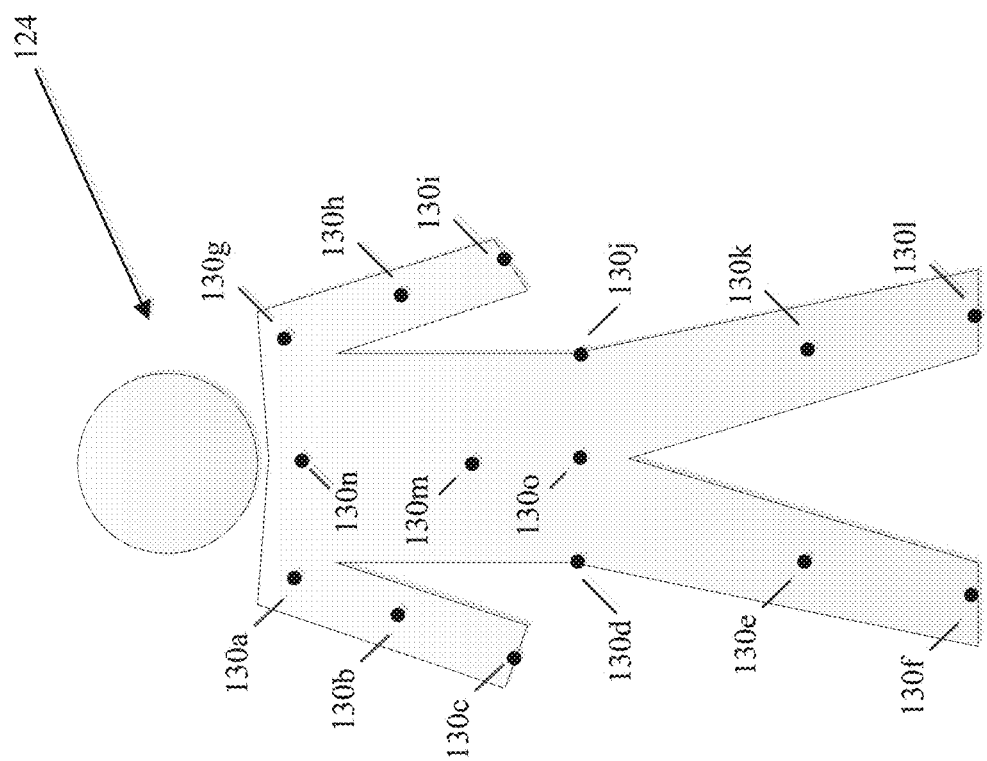
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a, center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

II. Example Integrated Communication Platform

Aspects of this disclosure relate to systems and methods that may be utilized to facilitate efficient communication between members of a group and organize an event among two or more members of the group within a single user interface. Computer-implemented systems and methods may be implemented to permit a member of a group to communicate through a communications platform that integrates targeted messages, group messages, as well as notifications regarding a proposed future event (or scheduled event) relating to the group. The systems disclosed herein may comprise hardware/software modules that, when implemented, generate a graphical user interface ("GUI" or "UI"), which may be provided through one or more of: a mobile software application ("app"), application, and/or other mechanisms that may reside either locally on each user's device and/or partially remote from at least one user's device.

Aspects of this disclosure relate to an integrated communication platform that may be utilized by one or more members of the group. The system may be configured such that each user may interact with a common interface. In one embodiment, the communication platform may be integrated within a virtual location, such as the group page or private link. For example, in one embodiment, a mobile software app on a portable user device (e.g., device(s) 112 and/or 128 or any other device), may be configured to permit a user to join or otherwise be associated with multiple groups. In one embodiment, a user input may select one group among a plurality of groups. In further embodiments, a module may be configured to receive an indication that a user has interacted with the UI, such as the user swiped in a first direction (e.g., a downward direction along a vertical axis), and in response, the system may reveal a unified and integrated communication platform, which may include for example, chatting, texting, and/or other forms of communication between two or more group members including text, audio, video, graphical objects, and combinations thereof.

In accordance with certain embodiments, each member of the group may have a designated virtual attribute when represented in the UI of the communication platform. For example, the shape, size, color of the user's font and/or background of their communications may be set. As one such implementation, a first user may have a black font positioned on white background while a second user may have a purple font on a white background. Thus, communications provided by each member within the unified communications function is distinct from each other member. The designated attribute(s) may be automatically assigned for group members or may be selectable. In one embodiment, certain messages (such as "Game" messages may always appear as a designated attribute, regardless of who sent them, so members may readily identify those messages. In certain embodiments, this may have the benefit of not causing a single user or group of users to feel responsible for being the organizer of the event or events for the group. In certain embodiments, selection or automatic setting of a first attribute may automatically adjust or select a second attribute, for example, the setting or selection of a font color for text may set a compatible background color and vice-versa. Alternatively, the system may provide the member with an option of a plurality of potential compatible combinations. Further embodiments may dynamically adjust the parameters of the user interface and/or propose potential combinations based upon the size, color contrast among colors, and size of the message or notification position. Example positions are explained in more detail below.

Figure 6A:
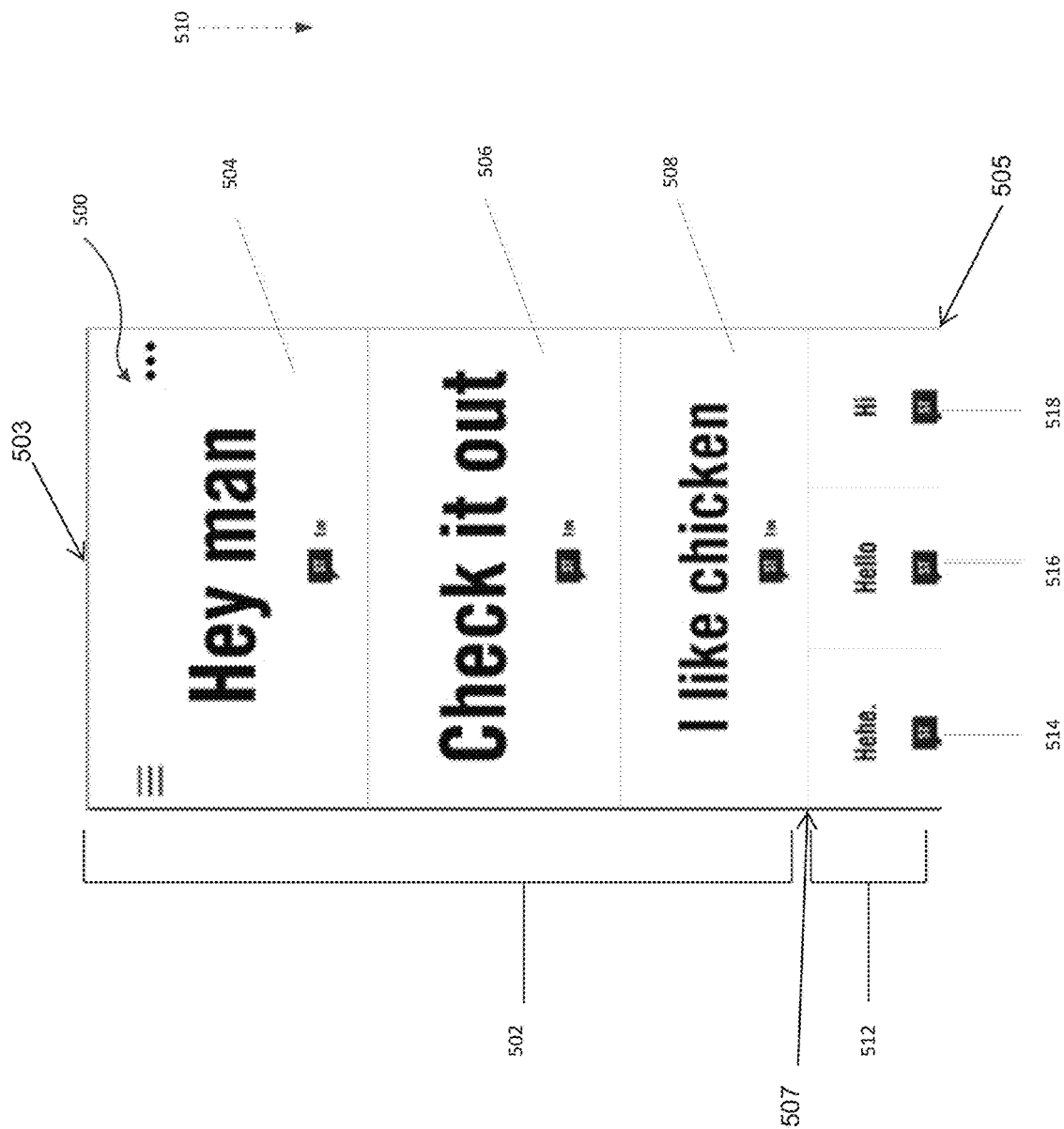
FIGS. 6A and 6B depict example user interfaces that may be implemented as part of an integrated communication platform.
Figure 6B:
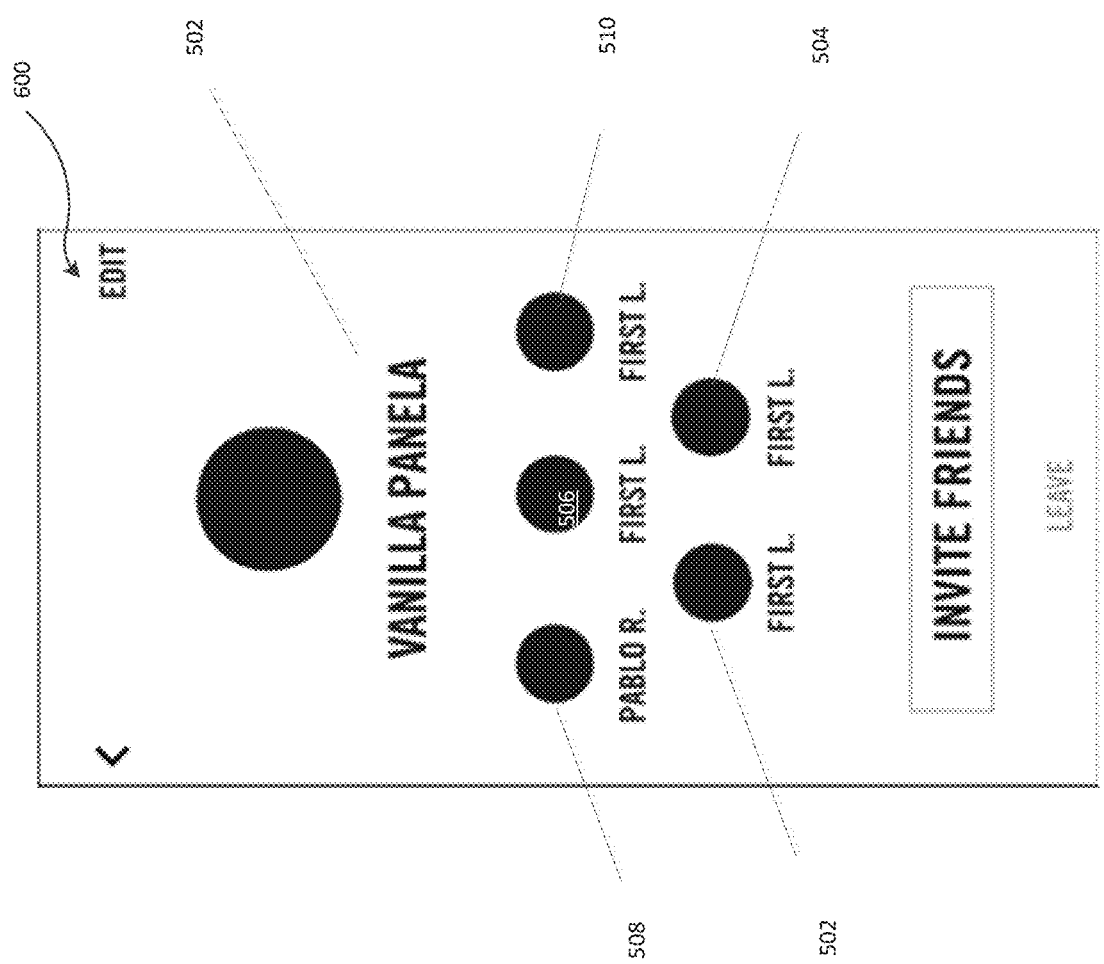

The messages from each user may be displayed along a single interface that is viewable to each member of the group upon accessing the group page, link, GUI, etc. FIG. 6A and FIG. 6B show an example user interfaces that may be utilized in conjunction with one or more embodiments disclosed herein. Aspects of this disclosure relate to an integrated communication platform that integrates notification functionality for the group. In accordance with one embodiment, any and all notifications for the group transmitted through the group page are also (or solely) conveyed via the communications platform. In certain embodiments, select notifications are provided via the communications platform. In one embodiment, notifications may be transmitted and/or received and integrated within the communication platform in which the notifications are in relation to event scheduling, including indications of proposed and/or accepted times and/or locations, as well as possible members who may be participating in the event. In this regard, aspects of this disclosure relate to systems and methods that may be implemented to organize an event among various possible participants (e.g., the group members) that is provided in the context of messages transmitted between various combinations of members within the group.

Notifications may be transmitted via the communications platform regardless if the member (or user) transmitting the message is currently or actively engaged in a conversation using the communication platform. In further embodiments, actions taken by a member (or user) that relate to a proposed event, scheduled event, past event of the group for which the integrated communication platform is set up for may be integrated into the communications platform. In this regard, a notification object may be positioned dynamically in a temporary or permanent configuration to be part of the chat or messaging as if it is a member in a chat.

In certain embodiments, a message may be replaced with a notification. For example, upon a first member requesting or suggesting a proposed event for the group (example embodiments of possible methodologies are provided below), each user may receive a message. Upon a user responding to the message, that message may be replaced with a notification indicating that the user is scheduled to attend the event.

As indicated above and throughout this disclosure, the integrated communication platform may include both a chat functionality (such as discussed above) as well as activity notifications on a single UI. In one embodiment, the messages may be organized by a single hierarchical structure. Thus, in certain embodiments, messages including, for example, textual messages between two or more group members may be interspersed with notifications of member activities despite the fact that at least one of the notifications may be about (and/or from) a member that is not currently within an active conversation. Those skilled in the art will appreciate that other messages may include photos, videos, sound files, and the like.

FIG. 6A shows an example UI 500 that may be implemented as part of an integrated communication platform that integrates both messages and notifications in a single hierarchical structure. The single hierarchical structure may include a first level. For example, level 502 may be a first level in accordance with one embodiment. As shown in the illustrative embodiment, level 500 may provide messages and/or notifications in a chronological ordering along a first axis. Thus, the first level may have a plurality of positions. For example, positions 504, 506 and 508 of the first level 502 are shown as displaying messages in chronological order along the vertical axis (shown by arrow 510). Chronological ordering may be based, for example, on time stamps, which may represent when the message was sent from a user/member and/or received by a computing device (including a server and/or end user device). Likewise, timestamps for the notifications may be based on one or more of the same factors, and/or a sensor reading, such as when a user's location was received at a specific location. One or more timestamps or data derived from time stamps may be visually displayed on the GUI, including in association with the hierarchical structure. For example, notifications and messages may be positioned along a vertical axis. Messages may include identification of the member transmitting the message and/or time stamp information.

In one example, the UI 500 may be configured to be displayed on a display device, such as display device 116. As depicted in FIG. 6A, the UI 500 may have a visible area, otherwise referred to as a UI display surface, that has a length extending between a first end 503 and a second end 505 along a first axis that is substantially aligned with arrow 510. Further, the UI display surface may have a width along a second axis that is substantially perpendicular to the first axis, and thus, perpendicular to arrow 510. In one example, the width of the UI display surface may be approximately equal to a width of the display device along the second axis. In one example, a first display level 502 may be positioned between the first end 503 and a transition point 507. As such, the first display level 502 may have a first plurality of display positions/display elements (e.g. display elements 504, 506, and 508) stacked along the first axis between the first end 503 and the transition point 507. Further, the second display level 512 may be positioned between the transition point 507 and the second end 505. The second display level 512 may have a second plurality of display elements aligned along the second axis, such as, in one example, display elements 514, 516, and 518.

In one example, the user interface 500 may be configured to receive a user input (e.g. an input to a touchscreen, or another navigational input that utilizes an input interface that may include a stylus, a keyboard, a trackpad, a mouse, voice commands or gestures, among others). In response to this user input, the user interface 500 may adjust/augment a displayed output. In one example, in response to a user input, the user interface may navigate in a direction along the first axis towards the second end 505, and transition one or more athletic activity notifications from the second display level 512 (these one or more athletic activity notifications may be referred to as "older" athletic activity notifications) to the first display level 502, and simultaneously removing one or more athletic activity notifications from the first display level 502 of the user interface 500 (these one or more athletic activity notifications may refer to as "newer" athletic activity notifications). In one specific example, scrolling the user interface 500 in the direction 510 may remove the athletic activity notification displayed within display element 504 from being visible on the user interface, and transition the athletic activity notification within display element 514 from the second display level 512 to the first display level 502 (i.e. from the display element 514 to the display element 508). In turn, and athletic activity notification within display element 516 may be repositioned into display element 514, and so forth. Further, in response to continued user input to the user interface 500 to navigate along direction 510, athletic activity notifications may transition between successive display elements 518, 516, 514, 508, 506, and 504. A In one example, the display elements 504, 506, 508, 514, 516, and 518 may be displayed in chronological order, such that of those athletic activity notifications displayed within the display elements 504, 506, 508, 514, 516, and 518, a most recently-received athletic activity notification is displayed within display element 504, a second most recently-received athletic activity notification is displayed within display element 506, a third most recently-received athletic activity notification is displayed within display element 508, a fourth most recently-received athletic activity notification is displayed within display element 514, a fifth most recently-received athletic activity notification is displayed within display element 516, and a sixth most recently-received athletic activity notification is displayed within display element 518. However, user interface 500 may be embodied with additional display elements to those 504, 506, 508, 514, 516, and 518 depicts an FIG. 6A.

In one implementation, and athletic activity notification displayed within those display elements of the second display level 512 may be truncated/shortened. Further, in one example, the user interface 500 may comprise a locked display element that does not change position when navigating through the user interface 500 along first axis aligned with arrow 510.

In one example, a user input requesting navigation of the user interface 500 in a direction along the first axis towards the second end 505 may cause the user interface to display a message input interface (e.g. comprising an input field and keyboard interface, among others) for inserting a new input message/notification above the most recently-received athletic activity notification at the first end 503 of the user interface 500.

Each position of a level (e.g., positions 504-508 of level 502) may be configured to be displayed in a manner that the message/notification occupying the position is the only information or object displayed on the user interface along a horizontal axis of the GUI. For example, the GUI may be configured such that the hierarchical structure substantially occupies the width of the displayed information or allotted display dedicated to the UI 500. For descriptive purposes, the horizontal axis may be considered the axis that is perpendicular to the vertical axis represented by arrow 510. Thus, in certain embodiments, the first position 504 of the first level 502 of the hierarchical structure occupies all or substantially all of the width of the GUI. For example, the first level may include 3 positions, in which the top first position 504 comprises the most recent message/notification and the 2nd and 3rd positions (e.g., 506 and 508) are "stacked" in a vertical arrangement along the vertical axis with the 1st position of the first level. Each of them may occupy substantially the entire width of the GUI (e.g., not including boarders, scrolling or navigation mechanisms, and similar elements).

As discussed above in relation to level 502, newer messages and/or notifications may be positioned towards the top and progress to older indications as you travel downward along the vertical axis 510. In certain embodiments, the hierarchical structure of UI 500 may include a plurality of levels. A second level of the hierarchical structure may be utilized in certain embodiments. The second level may be of a different dimension than the first level, both in terms of its overall dimensions with respect to the first level's overall dimensions and/or the dimensions of positions within the level. As shown in the illustrative embodiment of FIG. 6A, a second level 512 may be positioned, with respect to the horizontal axis (see arrow 510), below the 3rd position 508 of the first level 502. The second level 512 may be configured to display a plurality of messages and/or notifications along a horizontal axis. As shown in FIG. 6A, level 512 may be configured to display messages/notifications in a chronological order, such as for example, newer messages are displayed on the left and older messages are positioned on right. (e.g., positions 514, 516, and 518).

In one embodiment having a plurality of levels, the newest (most recent) messages and/or notifications may be positioned along the first level (e.g., level 502) in a chronological order (such as may be initiated with the first position 504) and then as newer messages and/or notifications are received, they are moved down the positions of the first level (e.g., through positions 506 and 508)) and then onto a second level, such as second level 512, and moved to position 514 and then through subsequent positions on the second level (e.g., positions 516 and 518).

In one embodiment, the positioning of messages/notifications may be based solely on the time stamps, however, in other embodiments, it may be based on user profiles, the type of message or notification, among other criterion. For example, in one embodiment, one or more levels may be designated only display certain messages or notifications. As one implementation, communications between members (which may include messages from others even if the intended-viewing member is not part of the communication) may be displayed along the first level and notifications relating to the next scheduled event and/or proposed event may be positioned along the second level. In certain embodiments, location and/or time related notifications may be positioned along a specific level.

Regardless of the one or more criterion utilized, the content of messages and/or notifications may be altered or otherwise adjusted as a message or notification progresses from one level to another. For example, if a notification is displayed in the first level (e.g., level 502), it may include a time and a location of a proposed event as well as a time stamp, yet as it moves to different positions within the same level and/or to a different level (e.g., level 512), it may lose one or more attributes that are displayed without the user having to interact to obtain the same information. For example, the location or the time may be removed, followed by the other, and/or both may be removed, and only a time stamp is shown. This may allow a member to readily observe without further interaction that a notification was sufficiently far enough in the past to not warrant immediate attention.

Navigation through the communication platform (which may be also referred to as the communication-notification platform) may permit that objects/messages/notifications progress back from the one level to another level. For example, if a user wishes to "scroll" or navigate through older messages/notifications, it may result in the message/notification in position 2 of the second level (e.g., position 516) to first be moved to the first position of the second level (e.g., position 514) and then the last position of the first level (e.g., position 508) and so forth. In yet other embodiments, navigation may be level-independent.

In certain embodiments, the UI 500 may be configured such that a member may post a comment/notification, and/or reply and/or comment to an existing comment/notification by clicking on or otherwise selecting the specific notification/message. Notifications may be automatically integrated into the platform, such as into one or more levels used to display one or more messages.

In one implementation, the UI 500 includes a notification area, such as a notification area associated with one or more positions 504, 506, 508, 514, 516, and 518, which displays a data output associated with a cumulative number of members that have replied with a response to an enquiry. In one example, an enquiry may comprise an invitation for a group of one or more member users to participate in a proposed event. In this way, the proposed event may comprise, among others, an athletic activity (e.g. a soccer game, a basketball game, a group meeting to go jogging), or another social gathering (study group meeting, a business meeting, a concert). As such, in one implementation, the data output may comprise a cumulative number of invitees that have responded with a positive response (indicating that they will participate in a proposed event). In another implementation, the data output may comprise a cumulative number of invitees who have responded with one or more of a positive, negative, or an undecided response. As such, the data output may comprise a fractional breakdown of the number of responses based on the response value/type (e.g. one or more of yes/positive, no/negative, and/or maybe/undecided). Furthermore, the data output may be presented within UI 500 such that it is "locked" in position and substantially always visible while one or more of positions 504, 506, 508, 514, 516, and 518 may be movable (scrollable) along a vertical axis parallel to arrow 510. As such, in one example, the data output displaying the cumulative number of members who have replied may be configured to display on one or more of levels 502 and/or 512. In another example, the data output may be movable along the vertical axis with one or more of the stacked positions 504, 506, 508, 514, 516, and 518 upon actuation of the UI 500 by an input mechanism (any device or interaction that is capable of generation an means (input signal, such as for example, from a user touching a touch screen, input from one or more graphically-generated/physical buttons being depressed on an interface, and the like). In another example, a data output displaying a cumulative number of members who have replied may be associated with an interface level in addition to those levels 502 and 512. As such, in one example, the data output displaying a cumulative number of members who have replied may be movable separately to one or more of levels 502 and/or 512.

In yet another example, a data output displaying a cumulative number of members who have replied may be associated with a threshold number of replies. As such, the threshold number of replies may be associated with a number of positive replies specified before a proposed event is confirmed to be going ahead. In one implementation, an organizer may specify a number of positive replies to a proposed event that will be required before the event will be confirmed as proceeding as planned. In one specific example, the proposed event may be a game of soccer to be proposed to a group of friends (members), and a threshold number of positive replies may be 22. As such, the proposed soccer game may not be confirmed as proceeding as planned until 22 positive responses are received. Furthermore, the one or more positions (such as positions 504, 506, 508, 514, 516, and 518) displaying the cumulative number of invitees that have responded to a proposed event may be associated with a first state (e.g. a first color). Accordingly, the one or more positions (such as positions 504, 506, 508, 514, 516, and 518) displaying the cumulative number of invitees that have responded to a proposed event may change to a second state (e.g. changing from a first color to a second color) upon meeting or exceeding the threshold number of positive responses needed to confirm the proposed event as proceeding as planned.

Aspects of the disclosure relate to a user interface that graphically depicts members of the group, which may or may not be associated with their intended position or function, either for a single proposed or scheduled event or for general group activities. FIG. 6B provides an example GUI 600 that may be configured to graphically display members of the group 502 (named "Vanilla Panela"). The group 502 and/or its members may be represented with icons and/or, avatars, which may be animated or static. In certain embodiments, the displaying of the members (or possible openings that may be occupied by members) may be specific to positions or roles during the event or for the group. For example, a worldwide soccer team is usually represented by 5 players. Thus, the display of the users may be positioned or otherwise displayed in accordance with the position and/or in association with a minimum number required (e.g., 5). Users may select an open position, such as a forward position (e.g., see positions 502 and 504) or a goalie (e.g., position 506) for a specific event (upcoming pick-up game at specified time and/or location) or in general for a group as a whole. As seen in the illustrative example of FIG. 6B, a member of the group ("Pablo R") is the first person to join the group (or specific event among the group, such as upcoming possible pick-up game at position 508. The first member may be automatically assigned any slot, such as position 508, and it may have nothing to do with the actual player position during an event. Those skilled in the art will appreciate that there may be more members than there are available positions for an event for the group. This may be desirable in many instances as it will increase the likelihood that a minimum number will be attained from members that can attend or participate in a designated event.

In yet other embodiments, users may get to vote for which member gets a position (or positions) sought by more members than for which there is a current need for (e.g., positions 502, 504, 506, and 510, but not 508, which as shown in the illustrative example, is occupied). Further, by graphically displaying members or players for a specific game or event, it may be readily apparent when a minimum number (e.g., 5) is not obtained. It may in certain embodiments, provide members with a quick view to see what positions are still open. This may make it easier to determine whether to invite additional individuals as members, notify members, and/or other actions.

Figure 7A:
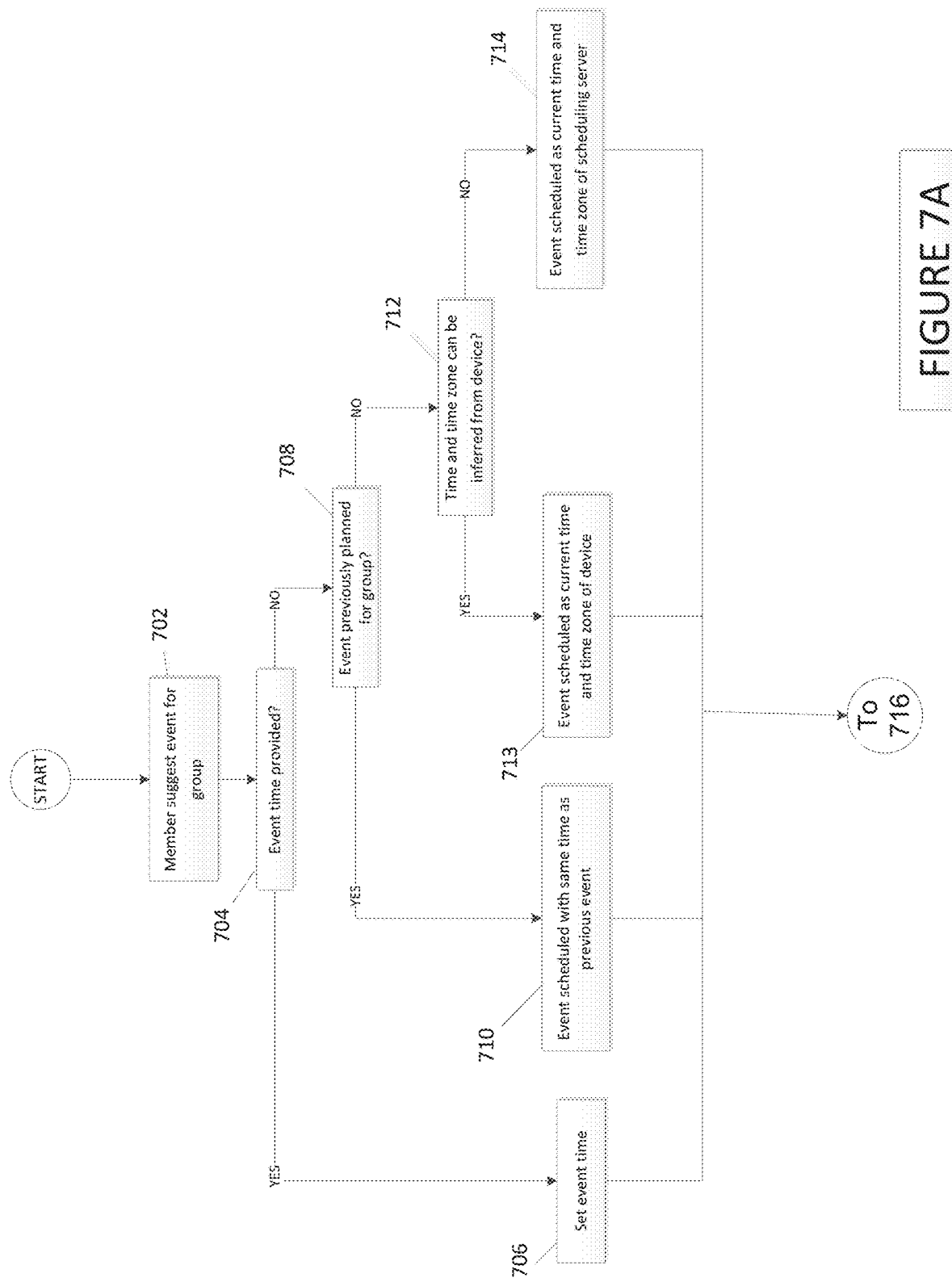
Figure 7B:
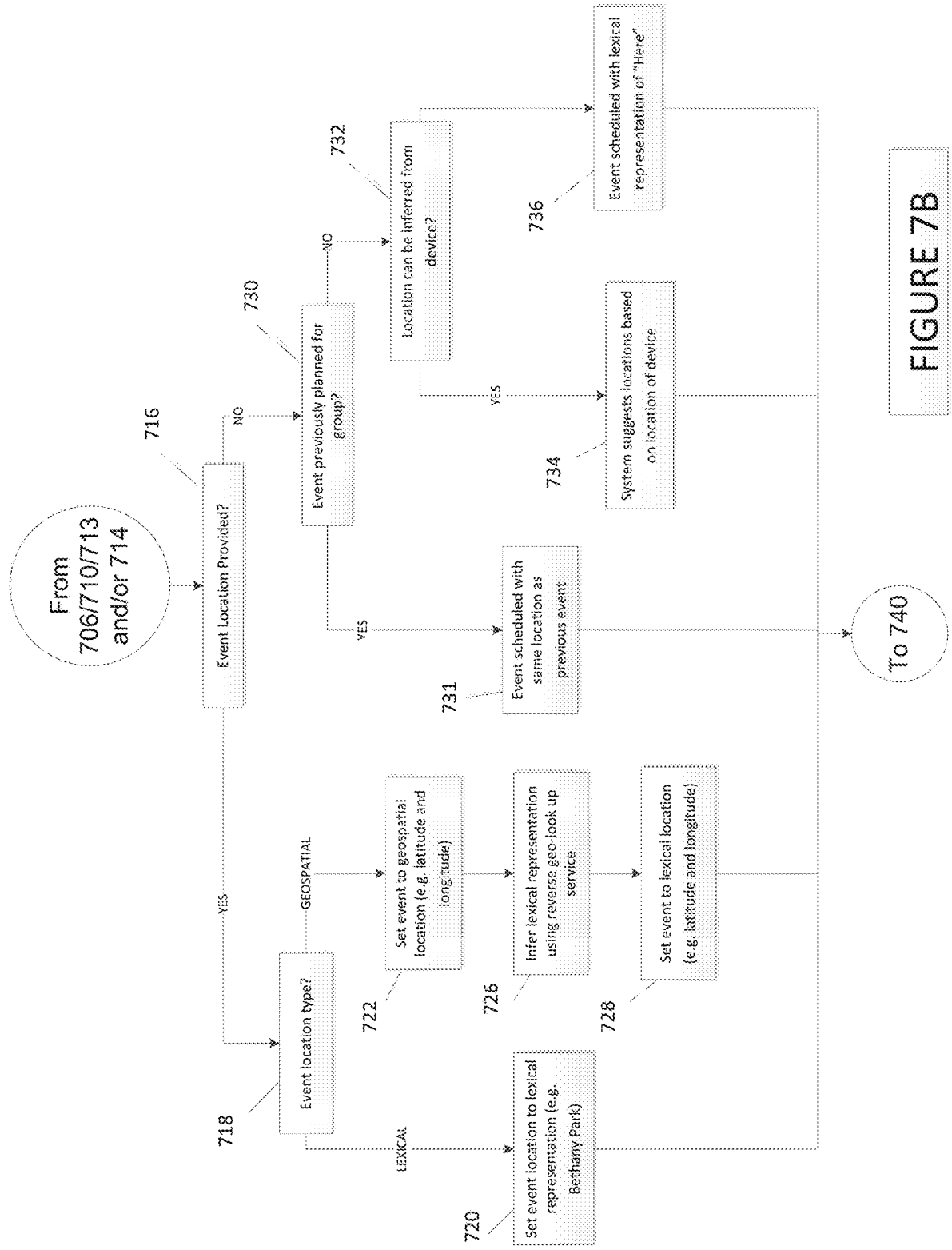

FIGS. 7A-7C show an exemplary flowchart 700 of an exemplary computer-implemented method of generating an event suggestion to members in a group. The method may be implemented via a GUI, such as implemented on a portable electronic device, which may in certain embodiments be associated with one or more GUI, such as those shown in FIGS. 6A and 6B. In one embodiment, the generation of an event suggestion, such as via GUI 700, may be implemented through an app or other software that is at least partially located on a local device. Yet in other embodiments, the software may be located on a remote device, such as a scheduling server. In one embodiment, a UI may visually display a listing of one or more groups that the user is part of. As it will be appreciated, users may belong to a plurality of different groups, which may be based, at least in part, on social aspects, event/sports type, work vs. personal events, and combinations thereof among others. The UI may permit the reception of a user input that selects one of a plurality of groups. The user may request invitation to groups and/or add members to existing groups. In one embodiment, an automated link may allow one or more users to join a group upon selection. In further embodiments, selection of one or more links may bring the user to the group page in the UI.

In accordance to one example, a member may suggest or propose an event for a group (e.g., 702). Information regarding the event may be directly received from the user making the suggestion, such as through a user input when suggesting the event at block 702 and/or another user input. As one example, location information may be received from a user device and/or server. The device from which the location information came and/or another device may process the location information and/or other information about the proposed event. For example, whether the event or activity is a soccer event, running event, or other event or respective skill level. In certain embodiments, this may be utilized to identify suitable locations in proximity to the user or an identified location to participate in the proposed activity/event. This may include identifying basketball courts, soccer fields, etc. that are currently being used or have been used for the proposed event or activity. In certain embodiments, identification and/or ranking of one or more locations may compare performance data of one or more users at the specific location to the user's historical data (either at that location and/or others). In this regard, information regarding the event may come from one or more other members and/or non-human data sources. For example, information may be obtained, either automatically or responsive to a user input, from a data source and may be parsed or otherwise analyzed, such as by a processor (e.g, see FIG. 2). Looking to example decision 704, it may be determined whether an event time has been associated with the event of block 702. If so, the time may be set (e.g., block 706). If not, however, a time may be associated with the event.

In one implementation, it may be determined whether a previous event for the group was planned and/or occurred (e.g., decision 708). In another embodiment, the determination may not be limited to the specific group for which the current event of block 702 is being planned in relation to. For example, it may look to other events (which may or may not be related to one or more other groups). Events planned and/or that took place involving one or more of the members of the current group may be considered. In accordance with one embodiment, if a previously planned event (or an event occurrence) is located, the event time may be, at least temporarily, indicated as the same time (see, e.g., block 710). For example, if historical data indicates that the group (and/or members within the group) conducted an event (e.g., a soccer game) at 3 pm in the past, then the time for a currently suggested soccer game (e.g., the suggested event) may be indicated for the same time.

A default time may be used in certain embodiments. For example, if information regarding a prior event involving at least one user of the group (and in some embodiments, the specific group for which the current suggestion is being planned for), is not available and/or cannot be determined, then a default time may be utilized. In one example, the prior event (or a future event that is already scheduled to occur) must be a "qualifying event" to be considered. A qualifying event is an event that meets certain pre-defined parameters. For example, if the current event being suggested is worldwide football (a.k.a., soccer), then the a qualifying event may have to be a worldwide soccer event. In certain embodiments, the qualifying event must be a worldwide football game and not just a practice session. In further embodiments, it may have to include at least one specific member of the group. For example, if a specific member of the group did not participate in the prior event (despite that member being within the group), then such an event may not be a qualifying event.

In another embodiment, a default time may be used based upon a determination that there was not a qualifying event, prior occurrence of an appointment, and/or prior event for the group. As one example, it may be determined whether the time and/or a time zone or other time-related properties may be determined from an electronic device of the user, such as a mobile terminal used by the user when making the group event (e.g., see decision 712, which may result in implementation of block 713 to set time from a specific device). It may consider GPS, IP address, system time, and/or combinations thereof, among others. For example, one embodiment, the event may be scheduled as the time determined from a user device (or from information derived at least in part from one or more user devices). In yet another embodiment, a default time may be set according to a scheduling server, which may be part of server 111 and/or located within cellular network architecture 108 and/or WAN architecture 110). As one example, a threshold level of time-related information may not be available and/or may be inconsistent, therefore the event may be scheduled according to the current time and/or time zone of the scheduling server (e.g., block 714). In another embodiment, a default time may be utilized irrespective of whether there was a prior qualifying event, prior occurrence of an appointment, prior event for the group, or combinations therefore or other factors discussed above.

In certain embodiments, it may be determined whether the suggested event of 702 comprises a location (e.g., 716). The determination of whether a location and/or time is provided in the suggested event of 702 may be conducted simultaneously, concurrently, in parallel, and/or a serial fashion with one or more other determinations, including each other or different determinations. Further embodiments may determine a type of the location information is provided, such as for example, whether the provided location is lexical or geospatial (e.g., decision 718) In one embodiment, if a location was lexical, a lexical representation may be set (e.g., block 720). In certain embodiments, a geospatial representation may also be determined, such as by a lookup table, search, and/or combinations thereof. If a geospatial representation is provided, the event may be set to the geospatial location (e.g., block 722). Regardless if block 722 is implemented, further embodiments may infer a lexical representation of the location, such as by using a reverse geo-lookup service (e.g. block 726). Thus, in certain implementations, the geospatial location provided may be converted to a lexical representation (see, e.g., block 728). One or more of the lexical and/or geospatial location types may be set.

Returning briefly to decision 716, it may be determined that an event location was not provided (or otherwise did not meet a quality threshold). In accordance with one embodiment, if a previously planned event (or an event occurrence) is located (such as through decision 730), the event location may be, at least temporarily, indicated as the same location (see, e.g., block 731). For example, if historical data indicates that the group (and/or users within the group) conducted an event (e.g., a soccer game) at location 033007 in the past, then the location for the currently suggested event may be indicated for the same location.

If information regarding a prior event involving at least one member of the group (and in some embodiments, the specific group for which the current suggestion is being planned for), is not available and/or cannot be determined, then a default location may be utilized. In one example, the prior event must be a "qualifying event". A qualifying event is an event that meets certain pre-defined parameters. For example, if the current event being suggested is worldwide football (a.k.a., soccer) then the a qualifying event may have to be a worldwide soccer event. In certain embodiments, the qualifying event must be a worldwide football game and not just a practice session or vice-versa. In further embodiments, it may have to include at least one specific member of the group. For example, if a specific member of the group did not participate in the prior event (despite that member being within the group), then such an event may not be a qualifying event. In another embodiment, if the location is not within a predefined radius or border, then it may not qualify as a qualifying event.

Further, some embodiments may filter and/or score the possible locations according to a quantity of qualifying events at the location (which may be limited within a time frame such as last month, last week, last 24 hours, etc.) as compared to other locations of qualifying events and/or proximity to the user and/or other group members. For example, in one embodiment, if location 090310 had 3 qualifying events by the group (or one or more users of the group) within the last month and location 033007 had only 2 qualifying events, location 033007 may still be selected based upon other factors, such as its proximity to one or more group members. In yet another, embodiment, 090310 may be selected due to it being marked as a favorite by one or more users or otherwise ranked higher. In yet another embodiment, the current location, last known location, and/or expected location of one or more users during the suggested event (or prior to) may be utilized. Although this criteria has been explained in context of location, those skilled in the art will appreciate that one or more aspects of this criteria or those equivalent and/or substantially similar may be used in association with time and/or other factors of the suggested event.

In another embodiment, a default location may be utilized irrespective of whether there was a prior qualifying event, prior occurrence of an appointment, any prior event for the group (or one or more users), or combinations thereof or other factors discussed above. In another embodiment, a default location may be used based upon a determination that there was not a qualifying event, prior occurrence of an appointment, or a prior event for the group. As one example, it may be determined whether the location or other location-type attributes may be determined from an electronic device of the user, such as a mobile terminal used by the user when making the group event (e.g., the group event of block 702). It may consider GPS, IP address, triangulation, accelerometer data, barometer data, and/or combinations thereof, among others. For example, in one embodiment, the event may be scheduled at the location determined from a user device (or from information derived at least in part from one or more user devices, e.g., decision 734).

The location of the event may automatically set, such as by using the member's location (which may be an indication of "here", e.g., block 736). Yet in other embodiments, the location not be set automatically (either though block 736 or any other implemented process), but yet may be suggested in a group of locations for selection by the user suggesting the event and/or by a vote by the group members. This may occur irrespective of whether the location of a user device may be determined and/or inferred. In yet another embodiment, a default location may be set according to a location-determining component, which may be located remotely on a server or locally, such as on a portable user device of a member. As one example, a threshold level of location-related information may not be available and/or may be inconsistent, therefore the event may be scheduled according to a location according to one or more criterion, such as those discussed herein and/or automatically by a server.

Upon a user (who may already be a member of the group for which the event is being suggested for) providing information, and/or the time and/or location being set (e.g., via one or more of blocks 706, 710, 712, 714, 720, 724, 731, 732, 736 and/or 738), the event may be scheduled with a time and location, and the user suggesting the event may be joined or otherwise associated with the scheduled event (e.g., block 740).

A notification of the scheduled event may be transmitted via one or more communication channels to the members of the group (e.g., block 742).

One or more users may be authorized to update and/or suggest revisions to the time, location, and/or one or more parameters of the event (e.g., block 744). In one embodiment, one or more members may vote to adjust one or more parameters of the suggested event. In certain embodiments, the votes may be considered from users indicating that they meet at least one criteria (e.g., suggested time or location of the currently scheduled event).

In this regard, it may be determined whether a group member wants to join the event (see, e.g., 742/746). If they do, they may be added to future correspondences and the like, such as at block 748 and/or have rights to provide suggestions, votes, and/or revisions. If a member declines the event (e.g., decision 750 and block 752, it may remove them from future suggestions, votes or revisions. One or more devices may notify the users of the event membership (block 754).

The notification may be provided in a unified chat or text. For example, the indication that a user joined the event may be provided as on a GUI inline or otherwise within the conversation of the group.

III. Dynamic Location

As discussed above, one or more aspects describe systems, apparatuses, computer readable media, and methods for using geographic information in connection with sporting activities, including but not limited to proposing and/or scheduling events among members of a group. Sensors may be attached to or integrated with a member's electronic device, such as a mobile terminal, tablet, or wearable device. One or more sensors may be used to collect performance data and/or geographic location information. Sensors may include accelerometers, pressure sensors, gyroscopes and other sensors that can transform physical activity into electrical signals. Data may be transmitted between multiple devices. Leader boards may be generated for individual members, teams and/or leagues. Location information may be associated with known sporting locations, member locations (past, present, and predicted future locations) and systems and methods may allow users to search for other users and locations of sporting activities.

In some aspects of the invention, users may be permitted to interact with a remote server with portable electronic devices, such as mobile telephones, tablets, wearables, etc. The location may be detected, as described herein, using GPS devices, signal triangulation (e.g., cell phone towers, known WiFi locations, etc.) or by manually identifying a location using coordinates, zip codes, area codes, city names and/or combinations thereof.

Other types of location information may include a number of members (on one or more teams or leagues) in a particular area (region of country, world, particular route, city, state, zip code, area code, etc.). Location-specific information may also be provided during a scheduled, current or future event as the user reaches or comes within a predefined amount of distance of a location.

Figure 8:
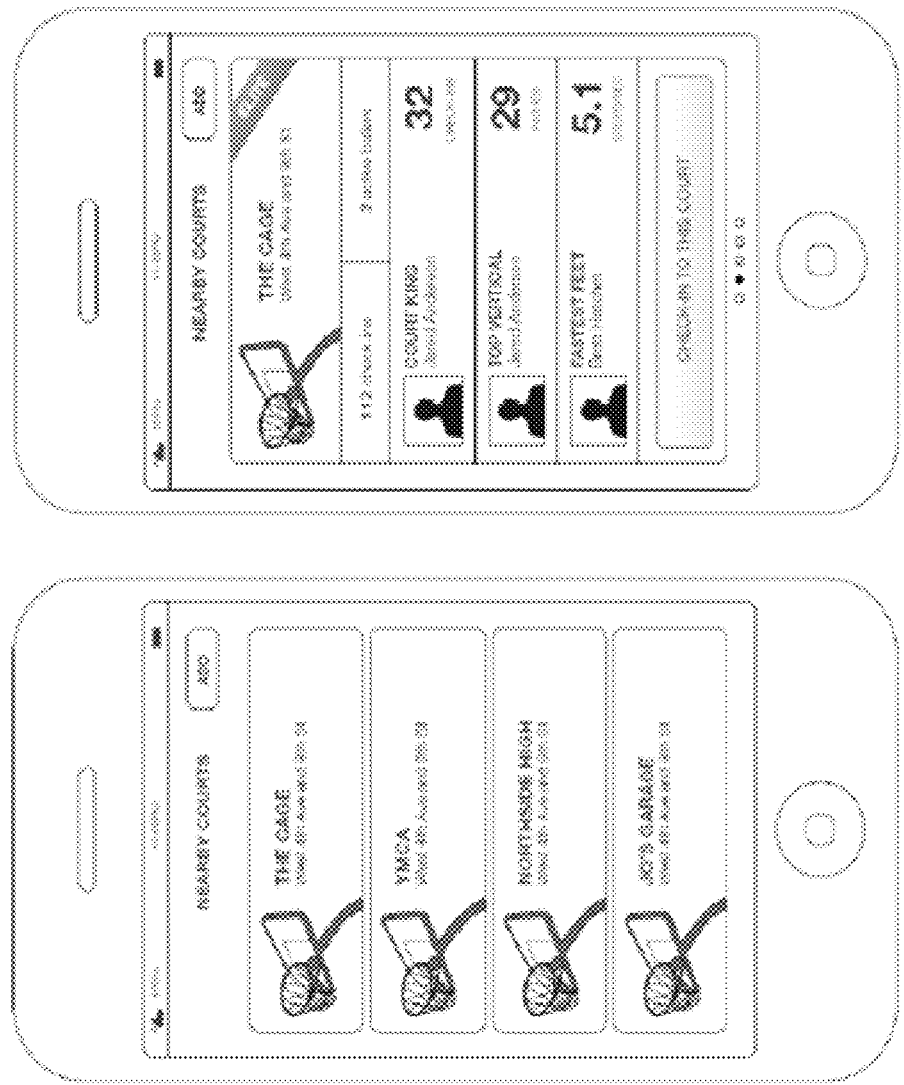
FIGS. 8 and 9 depict example GUIs to inform a member or user of opportunities and locations to participate in an event.
Figure 9:
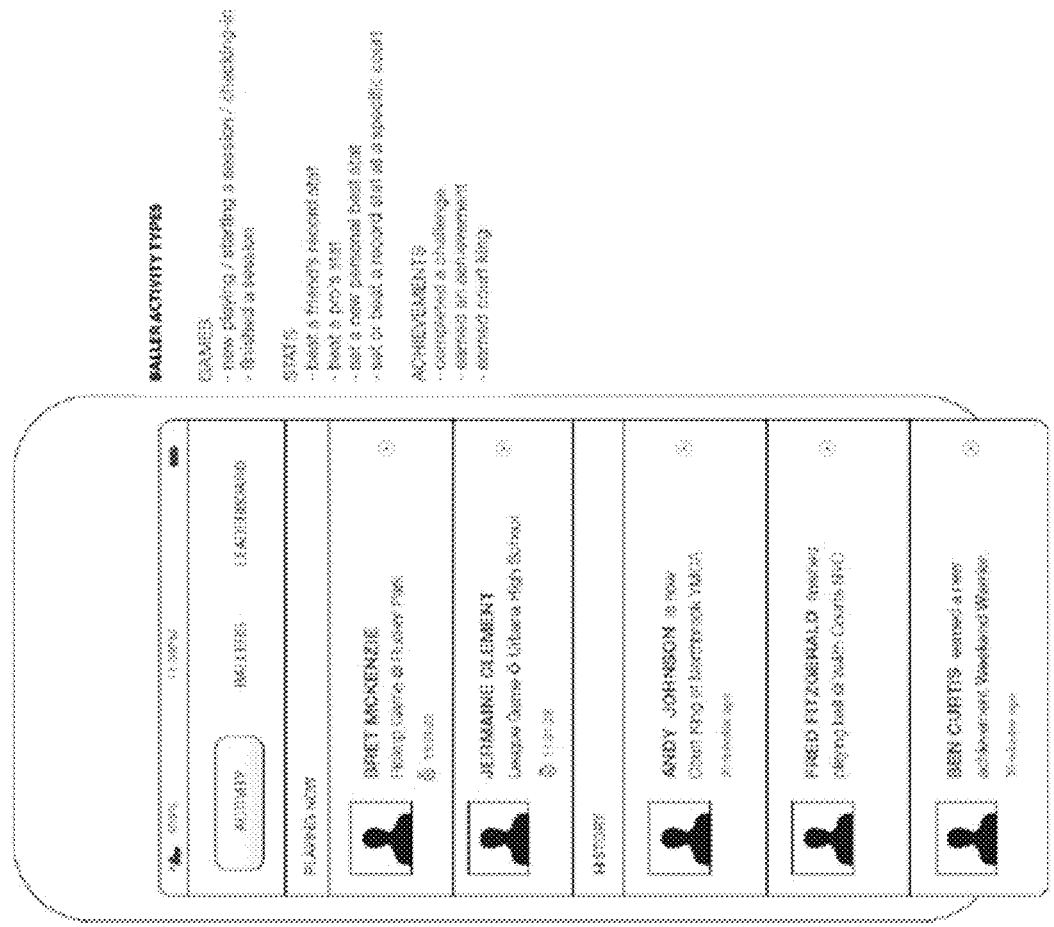

One or more processors may update a GUI to inform a member or user of opportunities and locations to participate in an event (e.g., such as a basketball game), as shown in FIGS. 8-9. For example, a computer may communicate a geographic location (e.g., GPS location) to another computer (with may be for example, a server, a mobile device, etc.) which may respond with nearby events that are ongoing or are scheduled to start soon (e.g., within the next hour). FIG. 8 illustrates two example GUI displays for identifying nearby basketball courts. On the left, the GUI of the computer 102 may provide a listing of nearby basketball courts and may provide a map to assist a user in locating a selected court. The GUI may also permit the user to add a court along with an address of the court.

On the right, the GUI presents information about a selected court. For example, the GUI may display regular players (e.g., a court king who most frequently plays at the court or soccer player who plays or checks in often at a field, etc.), and performance metrics of various players at that court (e.g., player with a highest vertical leap recorded at the court, player who takes the most amount of steps per second, most goals or saves, etc.). The GUI may prompt the user to check-in to the selected court and may indicate the number of active players on the court/field/location (as well as scheduled check-ins based upon user's indicated they accepted an invitation, such as through one or more of the integrated messaging platforms discussed above. When checking in, a device may communicate a check-in message to another computer (e.g., a server and/or another remote mobile device) via a network, and may update a database to indicate a number of times the user/team/etc. has checked in at that court/field/location. A device may also communicate the check-in via a network to computer devices of other members. Such notification may be integrated and automatically entered into a position of one or more levels of an integrated messaging platform, such as a platform discussed herein. In further embodiments, information may be transition to devices associated with individuals who request information about that location (court, field, etc.). Devices may include one or more GUIs (which may be part of the GUI having the integrated communication protocol) may also assist a user to identify courts where certain other users are playing.

FIG. 9 illustrates an example GUI for obtaining activity information about other participants. The GUI may permit the user to search for friends or other individuals to determine their current whereabouts. In other embodiments, this information may be automatically obtained and/or provided along with messages between members in an integrated communication platform, such as one disclosed herein. A device, which may be a server, may store information about who (member, team, league, individuals, etc.) is playing or scheduled to play at one or more locations and may communicate that information to users when requested. A user may also set up a user profile identifying individuals of interest who the user may wish to compete with or against, which may be on different teams and/or leagues (or could be on same league or team). Each user may be associated with a unique identifier that may be stored by the user profile and/or by the device.

A device may communicate a query containing the unique identifiers of one or more users to a device (e.g., remote server), which may respond with information about the queried users. As seen in FIG. 9, the GUI may display information about selected users who are now playing, as well as of a history of users who are not currently playing and/or accomplishments of the users. When a device requests information about a particular location, a device may communicate data (e.g., performance data) of users who have played at the particular court to a computing device.

A GUI (which may be integrated in an integrated communication platform) may be used to assist the user to find an ongoing session or a session starting in the near future (such as one scheduled through an integrated communication platform), identifying other players, and/or reviewing a leader board. The GUI may permit a user to start a new session (e.g., soccer/football/basketball etc. game) and to invite other players at a certain time (e.g., meet me at the high school field for a soccer game at 2 PM). The GUI may also display leader board information.

Performance data may be transmitted to one or more devices, such as user devices associated with members of a team and/or league. In one embodiment, performance data may be transmitted to team members who declined or otherwise could not attend the event in which the metric data was collected during. In one embodiment, it may server as an incentive to participate in a future event. In another embodiment, it may serve as a notification of score or progress of an ongoing game. This may be useful if the user could not attend or is running late. Thus, in certain embodiments, notifications of performance data may only be transmitted to members that indicated (such as via an integrated communication platform) that they would participate/attend a scheduled or proposed event, however, are absent for at least a portion of it, such as running late. Their location data may be used to determine that they are a predefined distance away from the location and transmit a message/notification (which may be transmitted via an integrated communications platform. In one embodiment, the notifications of game progress/performance data may be transmitted with different aesthetic properties that scheduling notifications, yet in other embodiments, they may be the same. This may be in a live or history field. In certain embodiments, the history field may inform the user of accomplishments of other individuals. For instance, alerts data regarding a user's achievements may be distributed to one or more devices. A user may elect to receive alerts for certain other users, such as by sending a message (including via the integrated communication platform). Prior to a user beginning a session, the user may indicate which performance metrics the users wishes to be monitored, transmitted, distributed, to which distribution channels, among other criteria.

Aspects of this disclosure relate to linking, such as through communication channels, aspects of the group functionality, including usage of the integrated communication platform, with other functionalities to improve the user experience. For example, an GUI with platform may collect or receive locational data, athletic performance data, user preference data, demographic data, and combinations thereof. Such data may be used to provide an improved user experience with other apps or offerings, such as use of other fitness and/or lifestyle apps (and may receive user and related data from these other devices (or software on the same device). Such data may be used to deliver media (audio, visual, combinations of one or more of these) with the GUI having the communication platform. And such data may be used in artificial intelligence and/or learning algorithms to learn behavioral patterns, athletic fitness, improvements, trends, and/or user data relating to marketing preferences. Further embodiments may allow users to capture media, such as audio visual media of the user performing at the events, which may be posted to various locations for viewing.

I claim:

1. An apparatus comprising:
a processor;
a communication platform comprising a user interface;
a non-transitory computer-readable medium comprising computer-executable instructions that when executed by the processor cause the processor to at least:
receive athletic activity notifications at the communication platform indicating that there are scheduled events within a predefined distance of a location of a user, wherein each athletic activity notification includes a threshold amount of attendees, and further wherein the athletic activity notifications are received in chronological order and include a data output displaying a total cumulative number of responses from users on the user interface for display on a display device, where the user interface has a first end and a second end, and wherein the total cumulative number of responses from users includes a cumulative number of positive responses and a cumulative number of negative responses;
populate the user interface with the athletic activity notifications received by the communication platform in chronological order, with a most recently-received athletic activity notification positioned at the first end,
determine by the communication platform the cumulative number of positive responses for the most recently-received athletic activity notification meets the threshold amount of attendees, and in response, change the most recently-received athletic activity notification from a first display state to a second display state confirming the future scheduled athletic activity is proceeding as planned;
display, on the first user interface, icons representing each of the users that submitted positive responses; and,
receive a first user input, and in response, display a message interface.

2. The apparatus of claim 1, wherein the user interface further comprises a locked display element that does not change position when navigating through the user interface along a first axis, wherein the locked display element is configured to display a status of an athletic activity associated with the scheduled events.

3. The apparatus of claim 2, wherein the status comprises a location and time of the athletic activity.

4. The apparatus of claim 2, wherein the locked display element is located at the second end of the user interface.

5. The apparatus of claim 1, wherein the user interface comprises:
a UI display surface having a length extending between a first end and a second end along a first axis, and a width along a second axis perpendicular to the first axis, the width of the UI display surface configured to be equal to a width of the display device along the second axis;
a first display level positioned between the first end and a transition point, and having a first plurality of display positions stacked along the first axis; and,
a second display level positioned between the transition point and the second end, and having a second plurality of display positions aligned along the second axis.

6. The apparatus of claim 5, wherein the first plurality of display positions extend across an entirety of the width of the user interface.

7. The apparatus of claim 5, wherein the computer-executable instructions when executed by the processor further cause the processor to at least:

receive a first user input through the user interface in a direction along the first axis towards the second end, and in response, display older athletic activity notifications by transitioning one or more athletic activity notifications from the second display level to the first display level and removing one or more newer athletic activity notifications from the user interface.

8. The apparatus of claim 5, wherein an athletic activity notification, when transitioned from the first display level to the second display level, is truncated.

9. The apparatus of claim 1, wherein an athletic activity notification, from the athletic activity notifications, comprises an invitation to participate in scheduled event that includes an athletic activity.

10. The apparatus of claim 1, wherein the first display state is a first color and the second display state is a second color.

11. A computer-readable storage medium storing computer-readable instructions that, when executed by a processor, cause the processor to at least:

transmit from a communication platform an electronic invitation to a plurality of users, the invitation comprising an invite to participate in a future scheduled athletic activity within a detected, predefined distance of locations of the plurality of users and identifying a predetermined threshold amount of required acceptances for the scheduled athletic activity;

generate, in response, a user interface, having a first end and a second end, configured to be both viewable and interacted with by each of the plurality of users, receive responses by the communication platform from at least a portion of the plurality of users, wherein the responses include an acceptance and a preferred position from at least a first user and a second user of the plurality of users in chronological order, populate the user interface with acceptances received from the at least first and second users in chronological order, with a most recently-received acceptance positioned at the first end;

confirm by the communication platform the number of acceptances received from the at least first and second users meets the predetermined threshold amount, and in response;

change the most recently-received athletic activity notification from a first display state to a second display state confirming the future scheduled athletic activity is proceeding as planned;

display, on the user interface, a first icon representing the first user's preferred position; and, receive a first user input through the user interface, in a direction along the first axis in a direction towards the second end causing the user interface to display a message input interface.

12. The computer-readable storage medium of claim 11, wherein an acceptance received from a user, of at least two users of the plurality of users, comprises a preference of a position on a sports team for the athletic activity.

13. The computer-readable storage medium of claim 11, wherein the user interface comprises:

a UI display surface having a length extending between a first end and a second end along a first axis of a horizontal plane, and a width along a second axis perpendicular to the first axis, the width of the UI configured to be equal to a width of a display device along the second axis;

a first display level positioned between the first end and a transition point, and having a first plurality of display positions stacked along the first axis; and a second display level positioned between the transition point and the second end, and having a second plurality of display positions aligned along the second axis.

14. The computer-readable storage medium of claim 13, wherein the second plurality of display positions are populated in chronological order, with a most recent acceptance displayed within a leftmost display position from the second plurality of display positions.

15. The computer-readable storage medium of claim 13, wherein the first plurality of display positions extend across an entire width of the user interface.

16. The computer-readable storage medium of claim 11, wherein a locked display element on the UI display surface is further configured to provide updated performance data of at least one of the first or the second user during the athletic activity.

17. The computer-readable storage medium of claim 16, wherein the computer-readable instructions further cause the processor to at least:

receive at least one message from at least one of the first user, the second user, or a third user of the plurality of users that is not an acceptance of the invite, and in response, determine that the first plurality of display positions are all populated, and in response, individually populating the second plurality of display positions with the at least one message in a chronological order;

receive a second user input through the user interface in a direction along the first axis towards the second end, and in response, display older acceptances by transitioning one or more acceptances from the second display level to the first display level and removing one or more newer acceptances from the user interface.

18. The computer-readable storage medium of claim 11, wherein the first display state is a first color and the second display state is a second color.

19. The computer-readable storage medium of claim 11, wherein an acceptance, when transitioned from the first display level to the second display level, is truncated.

20. The computer-readable storage medium of claim 11, wherein a background of a display position corresponds to an actual or preferred position to a user, from the at least two users of the plurality of users, from which an acceptance is received.

* * * * *